(12) United States Patent
Lee

(10) Patent No.: US 7,057,679 B2
(45) Date of Patent: Jun. 6, 2006

(54) LIGHT GUIDE PLATE FOR LIQUID CRYSTAL DISPLAY MODULE OF CAR AUDIO IN USE WITH THE LIGHT GUIDE PLATE

(75) Inventor: Wan-Woo Lee, Kyunggi-do (KR)

(73) Assignee: Hyundai Mobis Co., Ltd., Yongin (KR)

( * ) Notice: Subject to any disclaimer, the term of this patent is extended or adjusted under 35 U.S.C. 154(b) by 0 days.

(21) Appl. No.: 10/704,575

(22) Filed: Nov. 12, 2003

(65) Prior Publication Data

US 2005/0052589 A1  Mar. 10, 2005

(30) Foreign Application Priority Data

Sep. 6, 2003  (KR) ...................... 10-2003-0062333

(51) Int. Cl.
   *G02F 1/1335*  (2006.01)
(52) U.S. Cl. ............................. 349/65; 349/67; 349/68; 362/26; 362/489
(58) Field of Classification Search ................. 349/65; 362/67–68, 26, 489
See application file for complete search history.

(56) References Cited

U.S. PATENT DOCUMENTS

| | | | |
|---|---|---|---|
| 3,752,974 A * | 8/1973 | Baker et al. ................ | 362/627 |
| 4,909,604 A * | 3/1990 | Kobayashi et al. ........... | 349/64 |
| 4,975,808 A * | 12/1990 | Bond et al. .................. | 362/609 |
| 5,093,765 A * | 3/1992 | Kashima et al. .............. | 362/31 |
| 5,283,673 A * | 2/1994 | Murase et al. ................ | 349/65 |
| 5,394,308 A * | 2/1995 | Watanabe et al. ............. | 362/31 |
| 5,613,751 A * | 3/1997 | Parker et al. ................. | 362/31 |
| 5,886,759 A * | 3/1999 | Mashino et al. .............. | 349/65 |
| 6,196,691 B1 * | 3/2001 | Ochiai ......................... | 362/31 |
| 6,671,013 B1 * | 12/2003 | Ohkawa ...................... | 349/62 |
| 6,712,481 B1 * | 3/2004 | Parker et al. ................. | 362/31 |
| 6,733,147 B1 * | 5/2004 | Wang et al. .................. | 362/26 |
| 2002/0141174 A1 * | 10/2002 | Parker et al. ................. | 362/31 |

FOREIGN PATENT DOCUMENTS

| | | |
|---|---|---|
| EP | 1134488 | 9/2001 |
| JP | 5-264995 | 10/1993 |
| KR | 1999-023490 | 3/1999 |
| KR | 2003-0028304 | 4/2003 |

OTHER PUBLICATIONS

English Language Abstract of JP 5-264995.

* cited by examiner

*Primary Examiner*—Robert Kim
*Assistant Examiner*—Michael H. Caley
(74) *Attorney, Agent, or Firm*—Greenblum & Bernstein, P.L.C.

(57) ABSTRACT

The present invention relates to a light guide plate for a liquid crystal display back light and a liquid crystal display module of a car audio in use with the light guide plate, capable of preventing occurrence of a moiré phenomenon by removing a pattern on an incident light side.

6 Claims, 2 Drawing Sheets

[FIG. 1]
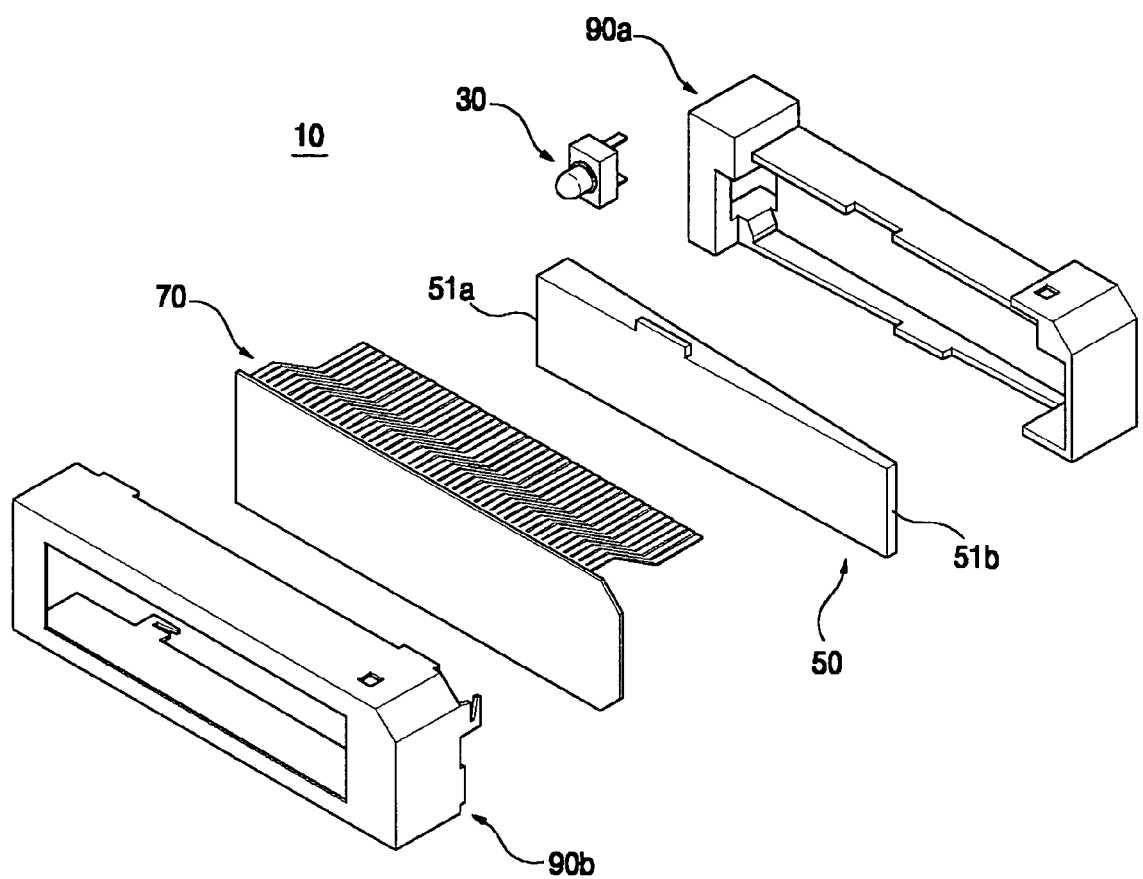

[FIG. 2]
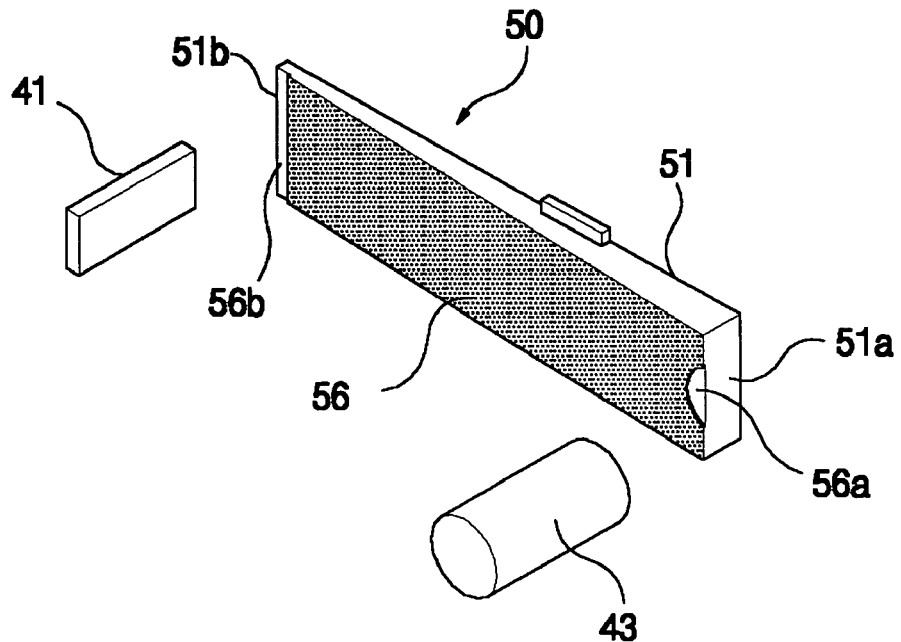
[FIG. 3] PRIOR ART
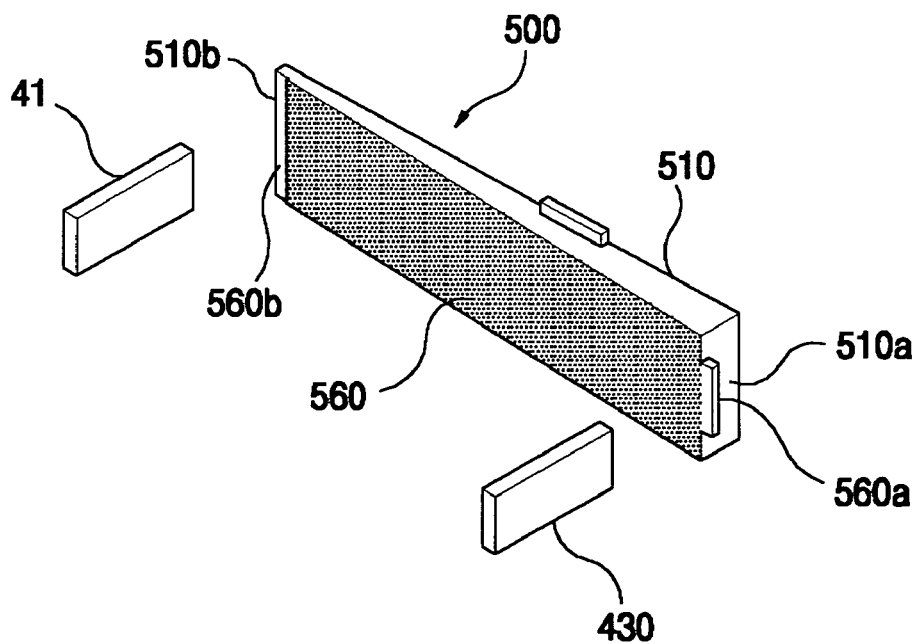

LIGHT GUIDE PLATE FOR LIQUID CRYSTAL DISPLAY MODULE OF CAR AUDIO IN USE WITH THE LIGHT GUIDE PLATE

The present disclosure relates to subject matter contained in priority Korean Application No. 10-2003-0062333, filed on Sep. 6, 2003, which is herein expressly incorporated by reference in its entirety.

BACKGROUND OF THE INVENTION

1. Field of the Invention

The present invention relates to a light guide plate for a liquid crystal display back light and a liquid crystal display module of a car audio in use with the light guide plate, capable of preventing occurrence of a moiré phenomenon by removing a pattern on an incident light side.

2. Description of the Related Art

In general, a display device is one of key electronic components prevailing in an information (oriented) society. Particularly, a light guide plate for a backlight system of an image display device such as a liquid crystal display device is a transparent flat plate or wedge shaped plate, and reflects the light from the light source, uniformly illuminating the entire area of the light guide plate.

This type of light guide plate has been disclosed, for example, in Korean Patent Publication No. 1999-23490 and 2003-28304; European Patent Publication No. 1,134,488 A1; and Japanese Patent Publication No. 1993-264995.

Typically, the related art light guide plate is a flat shape or wedge shape plate. Also, it is usually injection molded to a transparent material in the plastic group, e.g. acryl (PMMA: PolyMethylMetaAcrylate).

FIG. 3 illustrates a related art light guide plate. In this type of light guide plate, a light emitted from a light source 30 is incident on the inside of a plate 510 through an incident side 510a of the plate, and totally reflects the inside of the plate 510. Then the reflected light is dispersed by a pattern 560 formed on the rear surface of the plate 510, and exits the front surface (exiting surface) of the plate 510. To promote the reflection and dispersion of the light, the pattern 560 has an etched or serration structure.

The most difficult thing for designing a liquid crystal display module of a car audio in use with the light guide plate 500 having the above pattern 560 is that the width of the liquid display module has a limit. Thus a lamp, which is a light source in a LCD, is typically positioned adjacent to a view area of the LCD. In fact, this has a great impact on the brightness of the backlight structure. This explains why much of the light is scattered and a moiré phenomenon occurs adjacent to the backlight, eventually deteriorating an image display quality.

Meanwhile, a flat surface 560b without a pattern 560 is formed on the rear surface of an opposite side 510b of the light guide plate 500. During an injection molding of the light guide plate 500, a pin support plate 510a for supporting and positioning an eject pin 430 is attached to the incident side 510a to protect the pattern 560. The plate surface 560 is where the eject pin 41 is positioned. However, this pin support plate 510a should be removed when taking off or unloading the molding, and in fact, it only complicates a manufacture process and creates cracks on the surface during the removal.

SUMMARY OF THE INVENTION

It is, therefore, an object of the present invention to provide a light guide plate for a liquid crystal display back light and a liquid crystal display module of a car audio in use with the light guide plate, having a simple manufacture process and capable of improving an image display quality by preventing occurrence of a moiré phenomenon.

To achieve the above object, there is provided a light guide plate for a liquid crystal display back light, including: a flat plate disposed at one side of a light source; and a pattern formed on a rear surface of the flat plate, wherein the pattern is not formed on the flat plate adjacent to the light source.

With the above structure, the light guide plate with a molding being taken off or unloaded serves to prevent a moiré phenomenon, eventually simplifying a manufacture process.

In the exemplary embodiment, a thickness of the flat plate is gradually decreased in a direction from an incident side where the light source is disposed to an opposite side thereof. Hence, the incident light from the incident side of the light is more effectively incident on the pattern until it reaches the opposite side. Namely, light emission efficiency is improved.

Another aspect of the invention provides a liquid crystal display module of a car audio, including: a light source; a light guide plate having a flat plate disposed at one side of the light source and a pattern formed on a rear surface of the flat plate; a LCD panel disposed at a front surface of the light guide plate; and a housing for housing the light source, the light guide plate and the LCD panel, wherein the pattern is not formed on the flat plate adjacent to the light source.

Through the above constitution, a moiré phenomenon is prevented and thus, an image display quality is improved.

In the exemplary embodiment, a thickness of the flat plate is gradually decreased in a direction from an incident side where the light source is disposed to an opposite side thereof.

BRIEF DESCRIPTION OF THE DRAWINGS

The above objects, features and advantages of the present invention will become more apparent from the following detailed description when taken in conjunction with the accompanying drawings, in which:

FIG. 1 is a perspective view of separated parts of a liquid crystal display module of a car audio in accordance with a preferred embodiment of the present invention;

FIG. 2 is a rear view of a light guide plate of FIG. 1, depicting a state that the light guide plate is injection molded and the molding is later taken off; and FIG. 3 is a rear view of a related art light guide plate, depicting a state that the light guide plate is injection molded and the molding is later taken off.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 1 is a perspective view of separated parts of a liquid crystal display module of a car audio in accordance with a preferred embodiment of the present invention, and FIG. 2 is a rear view of a light guide plate of FIG. 1, depicting a state that the light guide plate is injection molded and the molding is later taken off.

As illustrated in FIG. 1, the liquid crystal display module 10 of a car audio of the invention includes a light source 30, a light guide plate 50 disposed at one side of the light source 30, a LCD panel 70 disposed at a front surface of the light guide plate 50, and a housing 90a; 90b for housing and shielding these components.

The light guide plate 50, as depicted in FIG. 2, includes a flat plate 51 and a pattern 56 formed on the rear surface of the flat plate 51.

As for another embodiment, the flat plate 51 can also be a wedge shaped flat plate. In the exemplary embodiment, the thickness of the flat plate 51 is gradually decreased in the direction from the incident side 51a adjacent to the light source 30 to the opposite side 51b of the incident side 51a. Through this wedge shape, the incident light from the incident side 51a of the light is more effectively incident on the pattern 56 until it reaches the opposite side 51b. To be short, light emission efficiency is improved.

The pattern 56 has an etched or serration structure. As discussed before, the rear surface of an opposite side 51b is formed of a flat surface 56b without the pattern 56. This flat plate 56b is where an eject pin 41 is disposed.

Meanwhile, a flat surface 56a is also formed on the rear surface of an incident side 51a. This flat surface 56a serves a double purpose in that it not only prevents occurrence of a moiré phenomenon by reducing the amount of dispersion of an incident light, but also provides a space for the eject pin 43. Preferably, this moiré-preventing flat surface 56a has a diameter of 10 mm from a center of the light source.

The housing 90a houses the light source 30, the sheet 60 and the light guide plate 50, and the housing 90b is a shield case for shielding the LCD panel 70. This housing 90a; 90b is fitted into a main body of a car audio.

In conclusion, the light guide plate for a liquid crystal display backlight and a liquid crystal display module of a car audio in use with the light guide plate has the following advantages.

First, the light guide plate includes the flat plate disposed at one side and the pattern on the rear surface of the flat plate, where the flat plate adjacent to the light source does not have any pattern thereon. Hence, the amount of light dispersion is considerably reduced around the portion without the pattern, so that the moiré phenomenon adjacent to the light source can be prevented. Moreover, the eject pin can be attached to the portion without the pattern, serving a double purpose, i.e. the prevention of moiré and unloading or taking off the molding.

Second, the thickness of the flat plate is gradually decreased in the direction from the incident side adjacent to the light source to the opposite side of the incident side. Hence, the incident light from the incident side of the light is more effectively incident on the pattern until it reaches the opposite side. Namely, light emission efficiency is improved.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A light guide plate for a liquid crystal display back light, the light guide plate being positioned behind the liquid crystal display, the light guide plate comprising:
   a flat plate with a substantially straight edge adjacent to a light source; and
   a pattern formed on a rear surface of the flat plate on a side of the straight edge except that, the pattern is not formed on a predetermined portion of the rear surface of the flat plate adjacent to the light source, the predetermined portion of the rear surface comprises a portion of a circular region and is configured such that there is a predetermined distance between the perimeter of the predetermined portion and the center of the light source.

2. The light guide plate for a liquid crystal display back light according to claim 1, wherein a thickness of the flat plate gradually decreases in a direction from an incident side, where the light source is disposed, to an opposite side.

3. The light guide plate for a light crystal display back light according to claim 1, wherein the predetermined portion of the rear surface is configured such that an eject pin is configured to attach to the predetermined portion for removing a molding.

4. A liquid crystal display module of a car audio system, comprising:
   a light source;
   a light guide plate having a flat plate with a substantially straight edge adjacent to the light source and a pattern formed on a rear surface of the flat plate;
   a LCD panel disposed at a front surface of the light guide plate;
   a housing for housing the light source, the light guide plate and the LCD panel, the pattern being formed on a side of the straight edge except that the pattern is not formed on a predetermined portion of the rear surface of the flat plate adjacent to the light source that comprises a portion of a circular region and is configured such that there is a predetermined distance between the perimeter of the predetermined portion and the center of the light source.

5. The liquid crystal display module of a car audio system according to claim 4, wherein a thickness of the flat plate gradually decreases in a direction from an incident side, where the light source is disposed, to an opposite side.

6. The liquid crystal display module of a car audio system according to claim 4, wherein the predetermined portion of the rear surface is configured such that an eject pin is configured to attach to the predetermined portion for removing a molding.

* * * * *